United States Patent
Lu et al.

(10) Patent No.: US 7,552,371 B2
(45) Date of Patent: Jun. 23, 2009

(54) METHOD AND SYSTEM FOR AUTOMATICALLY DIAGNOSING DISABILITY OF COMPUTER PERIPHERAL DEVICES

(75) Inventors: Ying-Chih Lu, Taipei (TW); Chi-Tsung Chang, Taipei (TW)

(73) Assignee: Inventec Corporation, Taipei (TW)

( * ) Notice: Subject to any disclaimer, the term of this patent is extended or adjusted under 35 U.S.C. 154(b) by 366 days.

(21) Appl. No.: 11/675,497

(22) Filed: Feb. 15, 2007

(65) Prior Publication Data

US 2008/0201609 A1    Aug. 21, 2008

(51) Int. Cl.
G01R 31/28 (2006.01)
G06F 11/00 (2006.01)
G06F 3/00 (2006.01)
G06F 13/24 (2006.01)
G06F 13/38 (2006.01)

(52) U.S. Cl. ............... 714/724; 714/44; 714/E11.165; 710/8; 710/15; 710/261; 710/262; 710/263; 710/264; 710/266

(58) Field of Classification Search ............... 714/724, 714/44, E11.165; 710/8, 15, 261–264, 266
See application file for complete search history.

(56) References Cited

U.S. PATENT DOCUMENTS 5,943,507 A * 8/1999 Cornish et al. ............... 710/48
7,200,700 B2 * 4/2007 Chen ........................ 710/266

* cited by examiner

Primary Examiner—John J Tabone, Jr.
(74) Attorney, Agent, or Firm—J.C. Patents

(57) ABSTRACT

A method and a system for automatically diagnosing disability of computer peripheral devices are provided. In the method, a set of interrupt configuration data relevant to a disabled PCI peripheral device, including relevant setting values of a hardware IRQ routing, is input and compared with a PCI IRQ routing table pre-stored in a boot control unit. Then, whether errors exist in the current setting values of the relevant control parameters and flags of all the relevant control units are automatically checked. If an incorrect setting value is found, a corresponding diagnosis result message is displayed for informing the user to make a modification. Therefore, users can know the reasons that cause the computer peripheral device to operate abnormally and make the modification quickly and effectively.

8 Claims, 3 Drawing Sheets

METHOD AND SYSTEM FOR AUTOMATICALLY DIAGNOSING DISABILITY OF COMPUTER PERIPHERAL DEVICES

BACKGROUND OF THE INVENTION

1. Field of the Invention

The present invention relates to a computer information technology, and more particularly, to a method and a system for automatically diagnosing disability of computer peripheral devices that can be applied on a computer platform for providing a function of automatically diagnosing disability of the peripheral devices to the computer platform.

2. Description of Related Art

Peripheral Component Interconnect (PCI) is a bus architecture commonly adopted on a computer platform, which is used for externally connecting a CPU of the computer platform to various peripheral devices, such as a screen display, a hard disk device, an optical disc drive, and a network switcher, such that the CPU can perform data communication with the peripheral devices.

The computer platform under the PCI bus architecture usually adopts an IRQ (Interrupt Request) interrupt processing technology, such that each PCI peripheral device can send an IRQ message to make the CPU interrupt the currently executed operation when the data communication is needed, thereby the CPU is shifted to execute the process requested by the peripheral device.

However, in actual applications, the PCI peripheral device may operate abnormally after being installed onto the computer platform due to setting errors of configuration, control parameters, flags, or conflicts thereof. One solution to this problem is to use a hardware circuit to conduct an interrupt simulation by maintenance personnel, so as to determine whether errors exist in configuration parameter setting values of the disabled PCI peripheral devices and the current setting values of relevant control parameters and flags in the relevant control unit (including the CPU, BIOS, and south bridge chip) one by one by eyes. However, the disadvantage of this method is a waste of time and labor and has no efficiency.

SUMMARY OF THE INVENTION

In view of the above disadvantages of the prior art, the present invention is directed to a method and a system for automatically diagnosing disability of computer peripheral devices, which are used to automatically diagnose reasons that cause a PCI peripheral device to operate abnormally when the PCI peripheral device operates abnormally.

The method and a system for automatically diagnosing disability of computer peripheral devices of the present invention are designed, which are applied on a computer platform. The computer platform is provided with a CPU, a boot control unit (such as BIOS), an interrupt controller (such as a programmable interrupt controller (PIC)), and a peripheral device control unit (such as a south bridge chip). The peripheral device control unit is connected to at least one peripheral device through a bus interface (such as a PCI bus interface).

The method for automatically diagnosing disability of computer peripheral devices of the present invention at least includes: (P1) executing an interrupt configuration data check process, which includes the steps of first reading a set of inputted IRQ routing configuration data relevant to the peripheral device; then comparing the read IRQ routing configuration data with data existing in a PCI IRQ routing table pre-established in the boot control unit; if inconsistent, sending an interrupt configuration data inconsistent message; (P2) executing an interrupt line register check process, which includes the steps of first reading a current setting value in the interrupt line register of the peripheral device; then querying the PCI IRQ routing table pre-stored in the boot control unit to find a PIRQ routing control register in a peripheral device control unit corresponding to the peripheral device; then comparing with the current setting values of the read interrupt line register and the PIRQ routing control register; if inconsistent, sending an interrupt line register error message; and (P3) executing an interrupt controller check process, which includes the steps of checking whether the interrupt controller has masked each used interrupt line; if no, sending an interrupt line not masked message; and (P4) executing an interrupt flag register (IFR) check process, which includes the steps of checking whether a current setting value of the interrupt flag in the IFR in the CPU is a set value of enable setting; if no, sending an interrupt flag not enabled message.

As for the physical architecture, the system for automatically diagnosing disability of computer peripheral devices of the present invention at least includes: (A) an interrupt configuration data check module, which first reads a set of inputted IRQ routing configuration data relevant to the peripheral device; then compares the read IRQ routing configuration data with the data existing in a PCI IRQ routing table pre-established in the boot control unit; if inconsistent, the system sends an interrupt configuration data inconsistent message; (B) an interrupt line register check module, which first reads the current setting value in the interrupt line register of the peripheral device; then queries the PCI IRQ routing table pre-stored in the boot control unit to find the PIRQ routing control register in the peripheral device control unit corresponding to the peripheral device; then compares with the current setting values of the interrupt line register and the PIRQ routing control register; if inconsistent, the system sends an interrupt line register error message; (C) an interrupt controller check module, which checks whether the interrupt controller has masked each used interrupt line; if no, the system sends an interrupt line not masked message; and (P4) an interrupt flag register (IFR) check module, which checks whether the current setting value of the interrupt flag in the IFR in the CPU is an set value of enable setting; if no, the system sends an interrupt flag not enabled message.

The method and system for automatically diagnosing disability of computer peripheral devices are characterized in that a set of interrupt configuration data relevant to the disabled PCI peripheral device, including relevant setting values of the hardware IRQ routing, is input and compared with the PCI IRQ routing table pre-stored in the BIOS; and automatically check whether errors exist in the current setting values of the relevant control parameters and flags of all the relevant control unit; if an incorrect setting value is found,: a corresponding diagnosis result message is displayed to inform the user to make a modification. Therefore, users can know the reasons that cause the PCI peripheral device to operate abnormally and make the modification rapidly and effectively.

BRIEF DESCRIPTION OF THE DRAWINGS

The accompanying drawings are included to provide further understanding of the invention, and are incorporated in and constitute a part of this specification. The drawings illustrate embodiments of the invention and, together with the description, serve to explain the principles of the invention.

DESCRIPTION OF EMBODIMENTS

Embodiments of the method and system for automatically diagnosing disability of computer peripheral devices of the present invention are disclosed in detailed below with reference to the accompanied drawings.

Figure 1:
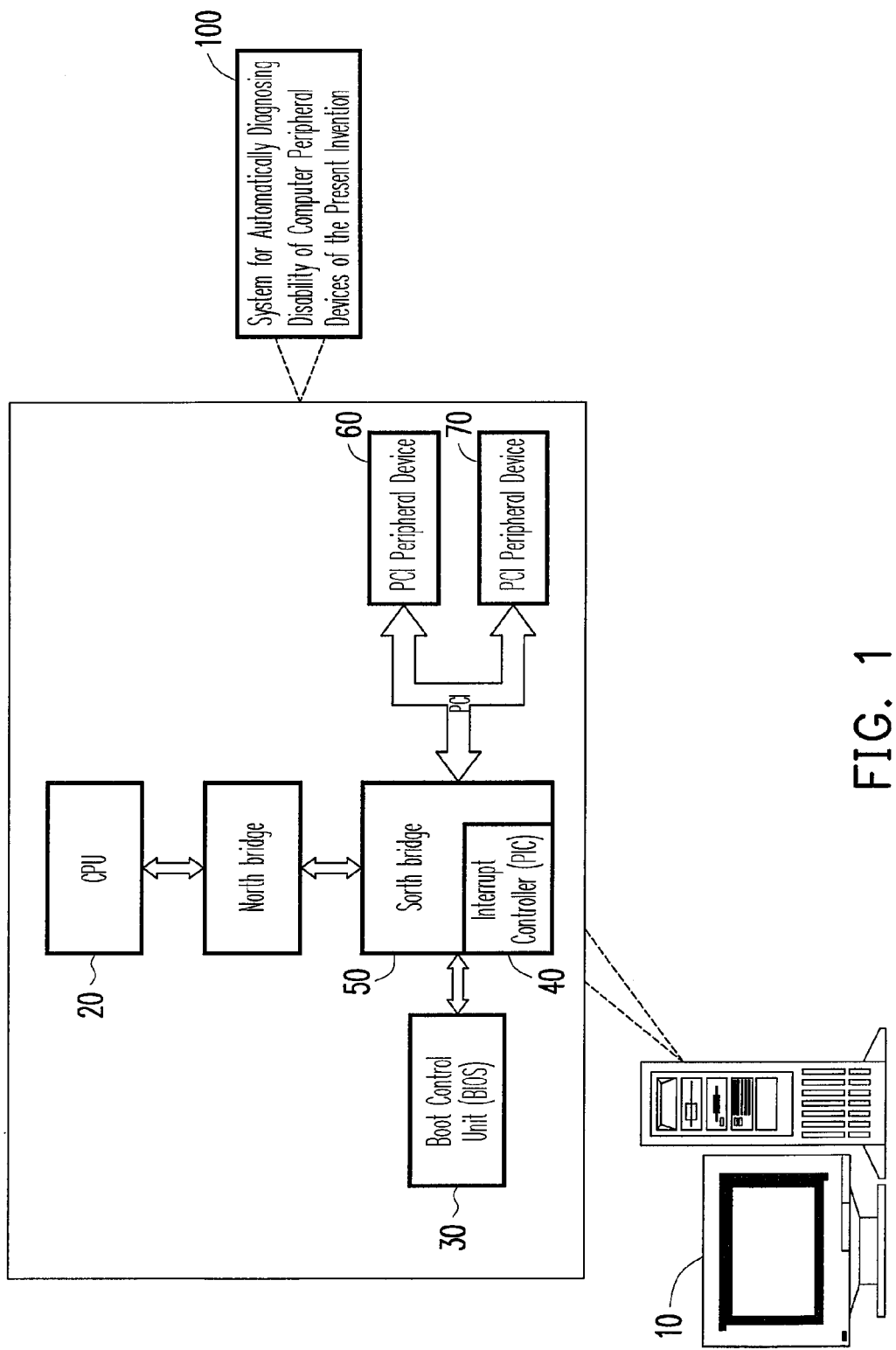
FIG. 1 is a schematic application view showing an application method of the system for automatically diagnosing disability of computer peripheral devices of the present invention.

FIG. 1 shows an application of the system for automatically diagnosing disability of computer peripheral devices (the block indicated by the reference number 100) of the present invention. As shown in FIG. 1, the system for automatically diagnosing disability of computer peripheral devices 100 of the present invention is loaded onto a computer platform 10, such as a network server or a desktop personal computer, in actual applications. The computer platform 10 is at least disposed with a CPU 20, a boot control unit 30, an interrupt controller 40, and a peripheral device control unit 50. The CPU 20 is, for example, an Intel Pentium CPU. The boot control unit30 is, for example, a BIOS (Basic Input/Output System) boot control unit. The interrupt controller 40 is, for example, a programmable interrupt controller (PIC). The peripheral device control unit 50 is, for example, a south bridge chip, which is connected to one or more PCI peripheral devices 60, 70 through a PCI (Peripheral Component Interconnect) bus.

In actual operations, the system for automatically diagnosing disability of computer peripheral devices 100 of the present invention provides a disability detecting function to the PCI peripheral devices 60 and 70. Thus, when any one of the PCI peripheral devices (assumed to be the peripheral device 60 hereinafter) cannot operate normally, the reason that causes the PCI peripheral device 60 to operate abnormally is automatically diagnosed.

Figure 2:
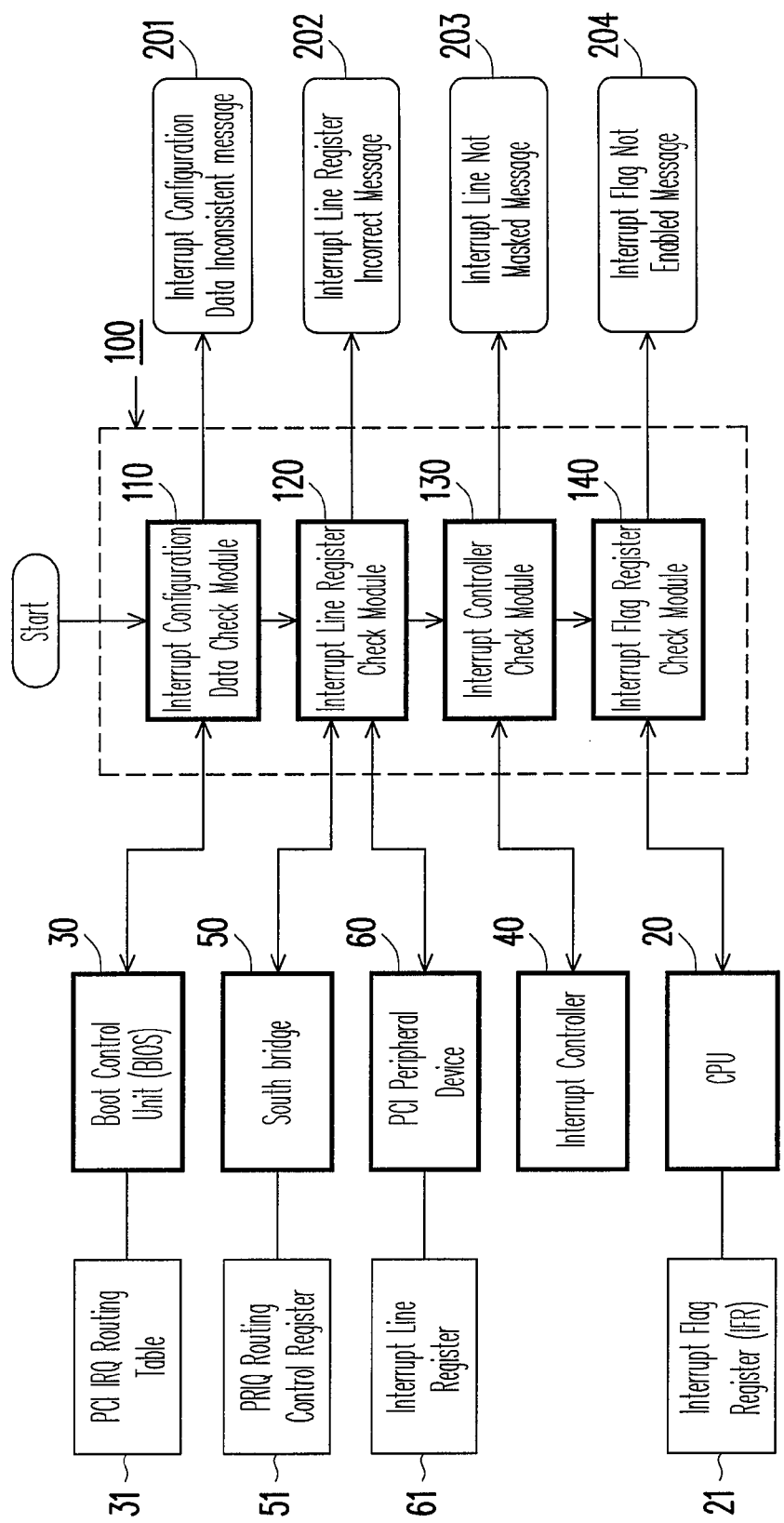
FIG. 2 is a schematic architectural view for a modulated basic architecture of the system for automatically diagnosing disability of computer peripheral devices of the present invention.

As shown in FIG. 2, the modulated basic architecture of the system for automatically diagnosing disability of computer peripheral devices 100 of the present invention at least includes (A) an interrupt configuration data check module 110; (B) an interrupt line register check module 120; (C) an interrupt controller check module130; and (D) an interrupt flag register (IFR) check module 140. In detailed implementation, the system for automatically diagnosing disability of computer peripheral devices 100 of the present invention can be realized with computer programs completely.

Hereinafter, an application example is used to illustrate the overall operation method of the system for automatically diagnosing disability of computer peripheral devices 100 of the present invention in the practical application with reference to the flow chart in FIG. 3. In this application example, if the user mounts two PCI peripheral devices 60 and 70 onto the computer platform 10, but the PCI peripheral device 60 operates abnormally, the user starts the system for automatically diagnosing disability of computer peripheral devices 100 to diagnose the disabled PCI peripheral device 60.

Figure 3:
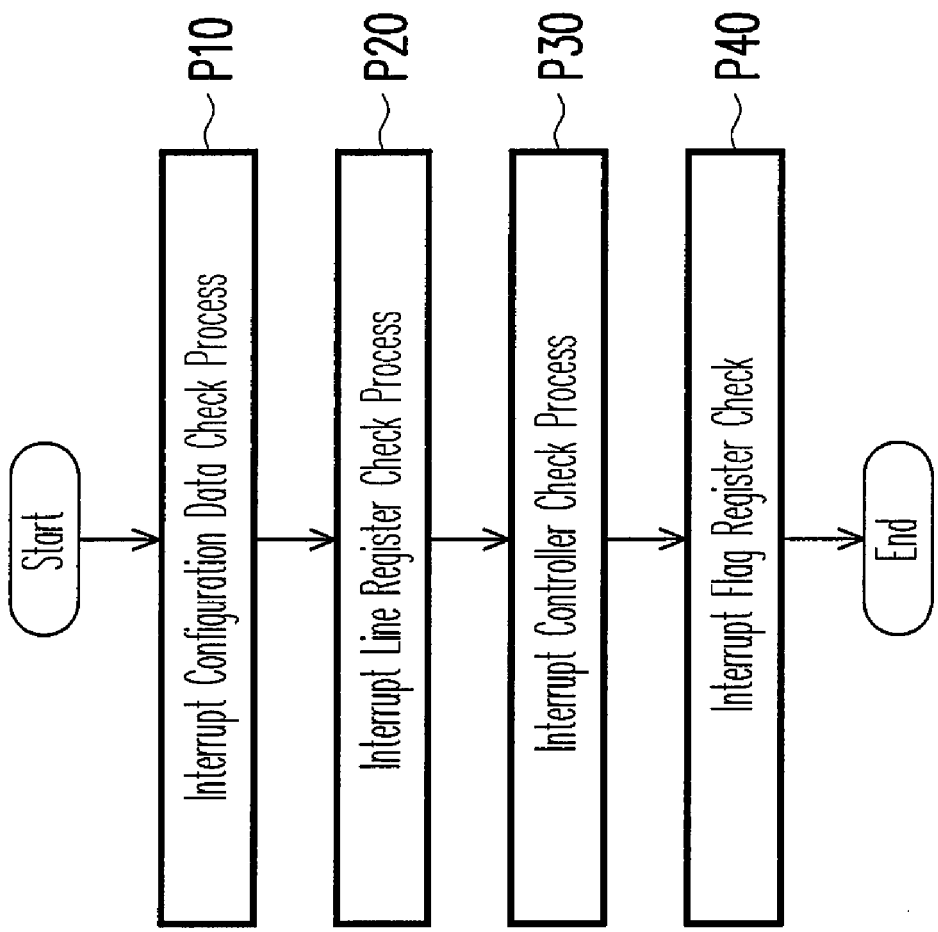
FIG. 3 is a flow chart showing each diagnosis check process executed by the system for automatically diagnosing disability of computer peripheral devices of the present invention.

After the system for automatically diagnosing disability of computer peripheral devices 100 is started, the interrupt configuration data check module. 110 is responsible for executing an interrupt configuration data check process P10 shown in FIG. 3. In the process P10, a set of interrupt configuration data relevant to the disabled PCI peripheral device 60 is read first, which includes a hardware IRQ routing setting value, the PCI device path (i.e., the path of connecting the disabled PCI peripheral device 60 to the peripheral device control unit (south bridge chip) 50), and the location of the disabled PCI peripheral device 60 (i.e., bus/device/function); then the read interrupt configuration data is compared with the data in a PCI IRQ routing table 31 pre-established in the BIOS boot control unit 30. If consistent, the interrupt configuration data of the disabled PCI peripheral device 60 has no problem; otherwise, if an inconsistent setting item exists, an interrupt configuration data inconsistent message 201 is sent, and the interrupt configuration data inconsistent message 201 (including the incorrect setting item) is displayed on a monitor screen 11 of the computer platform 10 to inform the user, such that the user can know the incorrect items and make modification accordingly.

The interrupt line register check module 120 is then responsible for executing an interrupt line register check process P20 shown in FIG. 3. In the process P20, the current setting value stored in the interrupt line register 61 of the peripheral device 60 is read first; then the PCI IRQ routing table 31 pre-stored in the BIOS boot control unit 30 is queried to find the PIRQ routing control register 51 in the peripheral device control unit (south bridge chip) 50 corresponding to the disabled PCI peripheral device 60, and the current setting value of the PIRQ routing control register 51 is then compared with the one of the read interrupt line register 61. If consistent, the current setting value of the interrupt line register 61 in the disabled PCI peripheral device 60 has no problem; otherwise, if inconsistent, an interrupt line register incorrect message 202 is sent, and the interrupt line register incorrect message 202 is displayed on the monitor screen 11 of the computer platform 10 to inform the user, such that the user can modify the setting value of the interrupt line register 61 accordingly.

The interrupt controller check module 130 is responsible for executing the interrupt controller check process P30 shown in FIG. 3, so as to check whether the PIC interrupt controller 40 has masked each currently used interrupt line; if no, an interrupt line not masked message 203 is sent and displayed on the monitor screen 11 of the computer platform 10 to inform the user to make a modification. In the detailed implementation, the interrupt controller check module 130 checks the interrupt line masking state of the PIC interrupt controller 40, for example, through an I/O port.

The interrupt flag register (IFR) check module 140 is then responsible for executing an interrupt flag register (IFR) check process P40 shown in FIG. 3, so as to check whether the current setting value of the interrupt flag (IF) in the interrupt flag register (IFR) 21 in the CPU 20 is an enable setting value; if no, an interrupt flag not enabled message 204 is sent and displayed on the monitor screen 11 of the computer platform 10 to inform the user to make a modification.

To sum up, the present invention provides a method and a system for automatically diagnosing disability of computer peripheral devices, which for example are applied in the function of automatically diagnosing the disability of PCI peripheral devices, and are characterized in that a set of interrupt configuration data relevant to a disabled PCI peripheral device, including relevant setting values of a hardware IRQ routing, is input and compared with a PCI IRQ routing table pre-stored in a boot control unit; automatically check whether errors exist in the current setting values of the relevant control parameters and flags of all the relevant control unit; and if an incorrect setting value is found, a corresponding diagnosis result message is displayed to inform the user to make a modification. Therefore, users can know the reasons that cause the PCI peripheral device to operate abnormally and make a modification quickly and effectively. To compare with the prior art, the present invention has better inventiveness and practicality.

Though the present invention has been disclosed above by the preferred embodiments, they are not intended to limit the present invention. The substantive technical content is broadly defined in the following claims. All technical entities or methods developed by any person else shall be covered by the Claims of the present invention, given they are identical to, or are equivalent modifications to, those defined in the following Claims.

What is claimed is:

1. A method for automatically diagnosing disability of computer peripheral devices, applied on a computer platform disposed with a CPU, a boot control unit, an interrupt controller, and a peripheral device control unit, wherein the peripheral device control unit is connected to at least one peripheral device through a bus interface for providing a disability detecting function to the peripheral device, the method for automatically diagnosing disability of computer peripheral devices at least comprising:

executing an interrupt configuration data check process, comprising the steps of reading a set of inputted Interrupt Request (IRQ) routing configuration data relevant to the peripheral device; then comparing the read IRQ routing configuration data with existing data in a PCI IRQ routing table pre-established in the boot control unit; if inconsistent, sending an interrupt configuration data inconsistent message;

executing an interrupt line register check process, comprising the steps of reading a current setting value in an interrupt line register of the peripheral device; then querying the PCI IRQ routing table pre-stored in the boot control unit to find a PIRQ routing control register in the peripheral device control unit corresponding to the peripheral device; then comparing with the current setting values of the interrupt line register and the PIRQ routing control register; if inconsistent, sending an interrupt line register error message;

executing an interrupt controller check process, comprising the steps of checking whether the interrupt controller has masked each currently used interrupt line; if no, sending an interrupt line not masked message; and executing an interrupt flag register (IFR) check process, comprising the steps of checking whether a current setting value of the interrupt flag in the IFR in the CPU is a set value of enable setting; if no, sending an interrupt flag not enabled message.

2. A system for automatically diagnosing disability of computer peripheral devices, integrated into a computer platform disposed with a CPU, a boot control unit, an interrupt controller, and a peripheral device control unit, wherein the peripheral device control unit is connected to at least one peripheral device through a bus interface for providing a disability detecting function to the peripheral device, the system for automatically diagnosing disability of computer peripheral devices at least comprising:

an interrupt configuration data check module for reading a set of inputted IRQ routing configuration data relevant to the peripheral device, comparing the read IRQ routing configuration data with an existing data in a PCI IRQ routing table pre-established in the boot control unit, and if inconsistent, sending an interrupt configuration data inconsistent message;

an interrupt line register check module for reading a current setting value in an interrupt line register of the peripheral device, querying the PCI IRQ routing table pre-stored in the boot control unit to find a PIRQ routing control register in the peripheral device control unit corresponding to the peripheral device, comparing with the current setting values of the interrupt line register and the PIRQ routing control register, and if inconsistent, sending an interrupt line register error message;

an interrupt controller check module for checking whether the interrupt controller has masked each currently used interrupt line, and if no, sending an interrupt line not masked message; and an interrupt flag register (IFR) check module for checking whether a current setting value of the interrupt flag in the IFR in the CPU is a set value of enable setting, and if no, sending an interrupt flag not enabled message.

3. The system for automatically diagnosing disability of computer peripheral devices as claimed in claim 2, wherein the computer platform is a network server.

4. The system for automatically diagnosing disability of computer peripheral devices as claimed in claim 2, wherein the computer platform is a desktop personal computer.

5. The system for automatically diagnosing disability of computer peripheral devices as claimed in claim 2, wherein the peripheral device is a Peripheral Component Interconnect (PCI) peripheral device.

6. The system for automatically diagnosing disability of computer peripheral devices as claimed in claim 2, wherein the boot control unit is a Basic input/output system (BIOS) boot control unit.

7. The system for automatically diagnosing disability of computer peripheral devices as claimed in claim 2, wherein the peripheral interface control unit is a south bridge chip.

8. The system for automatically diagnosing disability of computer peripheral devices as claimed in claim 2, wherein the interrupt controller is a programmable interrupt controller (PIC).

* * * * *